United States Patent Office

3,436,219
Patented Apr. 1, 1969

3,436,219
COLOR PHOTOGRAPHIC MATERIAL
Yasushi Ohyama, Takatsuki-shi, and Sadayuki Miyazawa, Kyoto, Japan, assignors to Mitsubishi Paper Mills, Ltd., Tokyo, Japan, a corporation of Japan
No Drawing. Filed Feb. 16, 1966, Ser. No. 527,761
Claims priority, application Japan, Feb. 26, 1965, 40/10,661
Int. Cl. G03c 1/40
U.S. Cl. 96—77        4 Claims

ABSTRACT OF THE DISCLOSURE

A color photographic material comprises a support and a plurality of multi-layered photographic coatings on the support consisting essentially of at least two sets of combinations of a silver halide sensitive emulsion layer and an underlying image-receiving layer for the diffusion-transfer-reversal process, dyed with appropriate dyestuffs for the silver-dye-bleach process. The sets are superimposed one upon another with the interposition of an image receiving layer as an interlayer between superposed sets, the interlayer containing a silver nucleating agent, such as colloidal particles of precious metals or insoluble metal sulfides or oxides.

---

The present invention relates to a novel color photographic material and more particular to one which utilizes the well-known silver-dye-bleach process.

The silver-dye-bleach process (a historical and technical review of the process is described by J. S. Friedman in his book "History of Color Photography," American Photo. Pub. Co., Boston, 1944, pp. 405–429) for the production of color photographs is based on the fact that an azo-dyestuff of which a large number is suitable for the purpose, e.g., Diamine Rose (Color Index No. 15080), Diamine Sky-Blue (Color Index No. 24410), Naphthamine Blue 2B (Color Index No. 22605), Brilliant Yellow (Color Index No. 24890), Heliotrope BB (Color Index No. 22470), Chloramine Red (Color Index No. 28160), with which the layer-forming material of a photographic silver halide emulsion layer is dyed, is bleached in the layer to an extent that depends on the quantity of image silver locally present in the layer after the exposure and the development takes place as usual, by means of a suitable dye-bleach bath.

One of the greatest drawbacks of the system described above, used for multi-layer-type color materials utilizing the principle of the two-color or three-color photography is an optical desensitizing action over the emulsion of the dyestuff used for dyeing the photographic emulsion layer because in the principle the emulsion-layer must be dyed with the dyestuffs which have color complementary to the color to which the emulsion is sensitized (for example, the emulsion layer sensitized to red must be dyed with cyan color dyestuff which absorbs red).

Another drawback which comes from the incorporation of the dyestuffs in the emulsion lies in the fact that these dyes may cause a chemical desensitization and in many cases they affect the sensitive emulsion to give rise to a chemical fogging at the same time.

It was believed, however, that to make image-wise destruction of dyestuffs, these must be included in the emulsion layer because the silver particles of the image act as a catalyzer for the destruction of the dyestuff and the silver image is usually developed only in the emulsion layer and it is impossible to destroy (or bleach) the dye where there is no image.

We have found a novel way to get rid of this very serious drawback of the silver-dye-bleach process utilizing a so-called "internal D.T.R. (diffusion-transfer-reversal)" process (i.e., the Method III of the variants of D.T.R. process described in C. B. Neblette's, "Photography, Its Material and Processes," p. 371, 6th ed., D. Van Nostrand Co., Princeton, N.J., U.S.A., 1962).

The D.T.R. process is usually utilized almost exclusively in the field of office-copying, graphic arts or retrievals of design-drawings from micro-film, and in a special variant of the D.T.R. process, usually a sensitive silver halide emulsion layer is coated on top of the non-sensitive reception layer which is precoated on a support, and after an exposure, the sensitive emulsion layer is developed by means of a developer that contains a silver halide solvent. In the course of forming a silver image (usually negative) in the exposed layer, the developer dissolves sufficient amounts of the unexposed silver halides (representing a reversal image to the developed image) which are transferred to the undercoated non-sensitive reception layer, creating a reversal silver image in the layer by a reaction of the dissolved silver halide and reducing substance (developer) around the nuclei in the reception layer. The above mentioned nuclei, which act as a catalyzer for the reduction of soluble silver salts to metallic silver, are usually colloidal particles of heavy metal origin, e.g. silver, gold or other precious metal particles, or particles of silver sulfide, cadmium sulfide, silver oxide, zinc oxide, etc.

So it is clear that if we utilize the above-mentioned internal D.T.R. process and the reception layer is dyed with appropriate dyestuffs we can make a reversal silver image in this layer and the dyestuffs in the layer can be bleached to an extent that depends on the quantity of image silver locally present in the layer and the aforementioned drawback of the silver-dye-bleach process will be removed because we do not need to incorporate the dyestuff in the emulsion layer that absorbs the light rays which are required to make the sensitized silver halide emulsion to be developed; and it is also clear that there is no drawback when we incorporate a dyestuff which does not absorb the light rays which are required to make the sensitized emulsion layer to be developed.

But this is the case with monochrome materials; in the case of three-color photography, where at least three sets of these combinations of a sensitive layer and a reception layer must be coated one upon another comprising a multi-layered material (at least six different layers involved), very complicated problems will occur because in these multi-layer materials the dissolved silver halide from unexposed parts of one of the sensitive layers diffuses out not only toward the underlying intended reception layer, but also toward the overlying reception layer, which is originally intended for the transfer from another sensitive layer overlying it.

The transfer of the dissolved silver complex in the unwanted direction is not easily restrained completely by a mere introduction of an intermediate layer as is usually done in the art because of the nature of diffusion itself. The object of the present invention is to avoid these particular problems occurring in the multi-layered color material.

A specific color material in our invention consists of a support and at least two or three sets of combinations of a silver halide emulsion layer and an underlying image-receiving layer for the D.T.R. process dyed with appropriate dyestuffs for the silver-dye-bleach process, superposed one upon another with colorless or differently colored image receiving layers as interlayers between every two sets of the aforementioned combinations and finally constituting a multi-layered color material.

In the construction described above, every sensitive silver halide emulsion layer, except in the top combination, is sandwiched between a colorless and a colored image-receiving layer or between differently colored image-receiving layers, i.e., one of the image-receiving layers adjacent to and usually coated under the sensitive layer is dyed and with the desired colored dyestuffs and another adjacent image-receiving layer usually overcoating the sensitive layer is colorless or dyed with dyestuffs of different color from the aforementioned desired color. After exposure the whole multi-layered material is treated with a developer which contains a silver halide solvent. In the course of development unexposed parts of silver halide dissolve out from the sensitive layer and diffuse toward both sides of the sandwich and the reduction of the dissolved silver complex salts to metallic silver takes place in these adjacent layers around nuclei included in the layers and as a result, silver image is formed in both image-receiving layers.

After washing out the residual developer from all the multi-layers, the material is treated with a bleach bath of a suitable composition, and dyestuff of desired color in the image-receiving layer are bleached out image-wise and there remains a colored image corresponding to the printed and developed image in the adjacent sensitive layer. The silver image produced in the colorless image-receiving layer does not work as a catalyst for bleaching because there is no dye at all in the layer. It is the main function of a colorless image-receiving layer as an interlayer to avoid a harmful interaction which might occur when the principle of the D.T.R. process is applied in combination with silver-dye-bleach process to the multi-layered color material. The object of dyeing the interlayer with differently colored dyestuffs is to prepare an image-wise mask which can act as a means for correcting the inadequate optical absorption characteristics of the dyestuff used for the production of the colored image and at the same time to avoid the harmful interaction described above.

The interlayer of this kind differs radically from the interlayer used customarily in the multi-layered color materials, because the interlayer of the invention contains nuclei which act as traps for the diffused silver complex to prevent the complex from diffusing into the next layer. The diffusion-resistant nature is very important and the capability of the complete avoidance of the mixing or interference of the unwanted color and shape from one combination to another, by means of this interlayer, is the essential feature of this invention.

A further understanding of our invention will be had from a consideration of the following examples illustrating certain preferred embodiments.

EXAMPLE 1

A typical image-receiving layer especially suitable for the introduction of substantive and acid azo dyes can be prepared by coating the following solution:

| | G. |
|---|---|
| Gelatin | 120 |
| Polyvinyl-alcohol | 120 |
| Copolymer of vinyl-methyl-ether and maleic-anhydride | 40 |
| Half amide of the above copolymer | 20 |
| Water to 7 l. | |

(and 0.8 g. of colloidal cadmium sulfide and an appropriate amount of substantive or acid azo dyes the color of which is required to make the color material workable and as specified in the following examples) on a support directly or over an interlayer in case of a multiple coating, by such an amount that after drying there remains a film of 3 to 5μ thick. Of course a small amount of surface active substances may be added as a coating aid.

In the event that an image-receiving layer is used as a colorless interlayer, the aforementioned dyestuffs must be eliminated from the coating solution.

EXAMPLE 2

After coating and drying a scarlet colored image-receiving layer colored by an introduction of 40 g. of Diamine Scarlet B (Color Index No. 22240) to the coating solution of Example 1 on the surface of a baryta-paper, and there is applied over this coating a sensitive layer of silver chloride photographic emulsion which is optically sensitized to red, these two coatings complete the first set of combinations of a sensitive layer and an image-receiving layer.

After applying a colorless image-receiving layer as an interlayer upon the first combination of coatings, another combination is applied and in this case, an optically non-sensitized silver chloride emulsion and an image-receiving layer colored by the introduction of 28 g. of Chicago Blue 6B (Color Index No. 24410) are used.

The two-color photographic material thus obtained is useful for the reproduction of industrial or commercial illustrations which use two-color or three-color lines or symbols, for example blue and red lines on white paper or for the production of 3-dimensional pictures from a pair of negatives, printed separately with blue and red light superimposed on the same paper and after processing the final picture may be observed through a respective color-filter (blue and scarlet).

The processing procedure of this material is as follows: after exposure the material is treated with the following develop-transfer solution for 1 minute.

| | G. |
|---|---|
| 1-phenyl-3-pyrazolidone | 1 |
| Sodium sulfite (anhydrous) | 50 |
| Hydroquinone | 10 |
| Sodium hydroxide | 7 |
| Potassium bromide | 1 |
| Sodium thiosulfate (crystal) | 5 |
| Water to 1 l. | |

After washing for a few minutes with running water, the print is next treated for 3 minutes in the following dye-bleach bath:

| | | |
|---|---|---|
| Thiourea | g | 200 |
| Hydroquinone | g | 100 |
| Hydrochloric acid (conc.) | ml | 20 |
| Methyl alcohol | ml | 300 |
| Water to 1 l. | | |

After brief rinsing, the residue of silver image which can not be bleached completely in the previous bleach bath, is completely bleached with the following rehalogenizing bath:

| | G. |
|---|---|
| Copper sulfate (crystal) | 150 |
| Sodium chloride | 100 |
| Citric acid | 100 |
| Water to 1 l. | |

The print then is washed (3 min.), fixed (5 min.) and finally washed (20 min.). After drying, a two-colored print (blue & scarlet) is obtained.

EXAMPLE 3

The basic solution for the image-receiving layer in Example 1 may be simplified by the introduction of reactive dyestuff to the following formula:

| | | |
|---|---|---|
| Gelatin | g | 300 |
| Water to 6 l. | | |
| Colloidal suspension of zinc oxide (0.7%) | ml | 100 |

Dyeing with a reactive dyestuff may be effected by incorporating the dyestuff into the above solution (at higher pH and neutralizing the solution after digestion) or by applying the dye-solution over the dried colorless image-receiving layer on a support and incubating the dyed layer for a few minutes at elevated temperature.

Reactive dyes suitable for this process are chosen from commercial dyestuffs such as "Remazol" dyestuffs (products of Höchst A.G., Germany), "Cibacron" dyestuffs (products of Ciba, Switzerland) or "Procion" dyes (I.C.I., Great Britain), and as described in detail in Example 5.

EXAMPLE 4

Dyes may also be incorporated in an image-receiving layer immobilized in numerous discrete microscopic particles of a binder which is soluble in a nonaqueous solvent and can be dispersed in an aqueous solution of an aqueous binder such as gelatin or polyvinyl-alcohol etc.; dyestuffs particularly suitable for this purpose are "Artisil" or "Foron" dyestuffs (products of Sandoz Ltd. in Switzerland), "Celiton" dyestuffs (products of I.C.I. in Great Britain) etc., and the binders suitable for the purpose are ethylcellulose, acetylcellulose, acetylstarch or starch ethers, all having very good affinity for the aforementioned dyestuffs.

Twenty grams of ethylcellulose (powder form) are dyed in a bath of the following composition:

| | |
|---|---|
| Artisil Discharge Blue 2-R _____ g__ | 1 |
| Water _____ ml__ | 100 |
| Methanol _____ ml__ | 100 | at 60°–70° C. for 2 hours; after washing with water and drying, blue-colored ethylcellulose powder is obtained. 10 g. of this blue powder, dissolved in 100 g. of toluol, is dispersed into a portion of 100 g. of 5% solution of gelatin in water with vigorous agitation and a small amount of an anionic surfactant.

A very stable dispersion of blue ethylcellulose in toluol droplets, of a diameter of about 1µ, is obtained and the dispersion can be used as an image receiving layer of the invention after adding 1.0 g. of colloidal silver sulfide dispersion and diluting with 5% solution of gelatin until the desired density of the dyestuff in the layer is uniformly attained.

Toluol or other non-aqueous solvent used for the preparation of the dispersion may be distilled off if it is desired to make a thicker colorant.

EXAMPLE 5

After coating and drying a colorless image-receiving layer as described in Example 2, the following solution of reactive dye is applied in an amount of 100 ml/m².

| | |
|---|---|
| Remazol Turquoise Blue G _____ g__ | 5 |
| Water _____ l__ | 1 |

Over the image-receiving layer of blue color thus obtained after drying and incubation of the layer for 5 minutes at 100° C., a silver chloro-bromide emulsion sensitized for the red region of the spectrum is applied and the first set of combinations of an image-receiving layer and a sensitive layer is completed.

Then, after applying a colorless image-receiving layer over it as an interlayer, next is applied the second combination of an image-receiving layer dyed red with the reactive dye of Remazol Brilliant Red B by incorporating the dyestuff in the coating solution (8 g./l.) and a chlorobromide emusion sensitized for the green region of the spectrum.

Over the second combination, there is applied again a coating of a colorless image-receiving layer and finally the third combination is applied which consists of an image-receiving layer dyed yellow with Remazol Yellow G (incorporating 12 g./l.) and an optically non-sensitized chloro-bromide emulsion. As a protective coating a very thin layer of gelatin is preferably coated on these multilayered coatings (three sets of combinations and two interlayers, 8 layers in all).

This material is conveniently used for making enlarged color prints from a color-negative as contrast to the usual practice of a silver-dye-bleach process where color prints are made from a color-positive (slide). After exposure, the material is developed in a conventional black-white developer not containing solvents for silver halide (for example well-known D-72 formula of Eastman Kodak or IL-51 of Ilford Ltd.) for about 1.5–2 min., then it is transferred to the following transfer bath and kept there for 2 min.

| | |
|---|---|
| Sodium sulfite (anhydrous) _____ g__ | 50 |
| Sodium thiosulfate (crystal) _____ g__ | 5 |
| Paper-developer (D-72 or IL-51) _____ ml__ | 50 |
| Water to 1 l. | |

After a 1 min. wash, the material is treated with the following dye-bleach solution for 15 minutes:

| | G. |
|---|---|
| Thiourea _____ | 60 |
| Potassium _____ | 80 |
| Hydrochloric acid (conc.) _____ | 20 |
| Amino-hydroxy-phenazine _____ | 0.001 |
| Water to 1 l. | |

The material goes through silver-bleach, fix and final wash as in Example 3.

If it is desired to obtain a color-positive from a color-slide using this material, it can be obtained by modifying the procedure slightly as follows; after exposure, develop (black and white), fix and then rehalogenize the developed image (black and white negative) to silver halide using copper-bleach bath as described in Example 3, this residual silver halide image can be transferred to the image-receiving layer using a develop-transfer solution as described in Example 3. Then the procedure goes through dye-bleach, silver-bleach, fix and final wash as described before.

The procedure described here is preferable to the reversal developing method, because reversal-development must use a very strong bleach bath (acid-dichromate or permanganate) which tends to destroy the dyestuff and sometimes stain the white area of a print. But this procedure is not applicable to the usual color-material which utilizes the silver-dye-bleach process and this is also one of the merits of our invention.

EXAMPLE 6

On the ordinary film base (cellulose triacetate or polyethyleneterephthalate), there is applied a first combination of an image-receiving layer and a sensitive layer, a combination of an image-receiving layer of the same or similar compositon as described in Example 1 containing 8 g./l. of Pontacyl Sky Blue 2BX (Color Index No. 24400) and a silver chloro-bromide emulsion sensitized to red light. Over the first set, as an interlayer, there is applied an image-receiving layer which is dyed slightly blue-green with Sirius Blue 6G (Color Index No. 34230, 2 g./l.) and then as the second combination, an image-receiving layer dyed magenta with Diamine Rose M (Color Index No. 15080, 12 g./l.) and a chloro-bromide emulsion sensitized to green. Then a coating of an image-receiving layer dyed light-violet with Heliotrope BB (Color Index No. 22470, 3 g./l.) is applied as an interlayer and the third combination of an image-receiving layer dyed yellow with Brilliant Yellow (Color Index No. 24890, 20 g./l.) and an optically nonsensitized chlorobromide emulsion and finally a protective over-coating are applied thereupon. The constitution of the over-coating is the same as or similar to the above-mentioned image-receiving layer, but with the exclusion of the colloidal metallic nuclei.

The material is particularly suitable for making color slides or enlarged color transparencies from color-negatives, but as described in Example 5, this material also can be used for making color-slides (direct-positive) in a camera or printing from color-positives (slides), and the procedure for development is almost the same as described in Example 5.

The shapes and color-density of the image produced in an interlayer correspond to those of the image that is produced in the main image-receiving layer of the underlying set of combinations, and the color chosen in the example is to correct the spectral absorbance of the dyestuff in this main image-receiving layer.

EXAMPLE 7

Over the coating of a blue-colored image-receiving layer as described in Example 4 on an ordinary film support, there is coated a high-speed silver iodo-bromide emulsion sensitized to red light and colored slightly orange with the addition of a dispersion of ethylcellulose dyed with a mixture of "Artisil Yellow 2GN" and "Artisil Scarlet 3GFL" (products of Sandoz Ltd. in Switzerland) in gelatine. The aforementiioned two layers comprise the first set of combinations of a sensitized layer and an image-receiving layer, and thereupon a colorless image-receiving layer is coated as an interlayer and then a second set of combinations consisting of a magenta-colored image-receiving layer colored with a dispersion of ethylcellulose dyed with "Artisil Rubine GFL" and a high-speed iodo-bromide emulsion sensitized to green and dyed slightly yellow with incorporation of a dispersion of ethylcellulose dyed with "Artisil Yellow 2GN" in the emulsion, is coated thereupon.

After coating a pink-colored image-receiving layer dyed with "Artisil Brilliant Pink 5BP" as an interlayer, the third set of combinations of a yellow-colored image-receiving layer colored with a dispersion of ethylcellulose dyed with "Artisil Yellow 2GN" and a non-color-sensitized high speed iodo-bromide emulsion are applied thereupon and finally a thin coating of 2% solution of gelatin is overcoated as a protective layer.

The material is suitable as a color-negative in a camera or by projection. In this case the dyestuff in the emulsion is not complementary to the color, to which the emulsion is sensitized, i.e., the dyestuff does not absorb the light rays which the emulsion requires to react, and as a result no desensitization occurs, which is the principal drawback of the silver-dye-bleach process. After processing there remains a color-positive imag ein the emulsion, the density and color of which is adjusted to compensate for the lack of absorbance of the negative color, and which remains in the image-receiving layer just under the emulsion. An apparent uniform orange color of the processed color negative is not so strong as compared with other recent commercial products, because the color of the dyestuff used in this procedure is far superior to the color of dyestuff produced in a usual color-development.

In this case only the interlayer between the second and the third set of combinations is colored, but a colored interlayer may be introduced between the first and the second sets, and the color and density of the interlayer which remains as a negative after processing is adjusted to correct the color absorbance of the main negative color image that remains in the undercoated combinations.

The invention has been described in detail with particular reference to preferred embodiments thereof, but it will be understood that variations and modifications can be effected within the spirit and scope of the invention as described hereinabove and as defined in the appended claims.

What is claimed is:

1. A color photographic material comprising a support and a plurality of multi-layered photographic coatings on said support comprising at least two sets of combinations of a silver halide sensitive emulsion layer and an underlying image- receiving layer constituted to cooperate with the overlying sensitive layer to form a silver image upon exposure and development, each said image receiving layer being dyed with appropriate dyestuffs for the silver-dye-bleach process, and an interlayer between superposed sets containing a silver nucleating agent.

2. A material as claimed in claim 1 wherein said nucleating agent comprises colloidal particles of precious metals or insoluble metal sulfides or oxides.

3. A material as claimed in claim 1 wherein said interlayer is colorless.

4. A material as claimed in claim 1 wherein said interlayer is an image-receiving layer which is dyed with dyestuffs of different color compared to the adjacent image-receiving layer of the adjacent set and constituted to cooperate with the underlying sensitive layer to form a silver image upon exposure and development.

References Cited

UNITED STATES PATENTS

| | | | |
|---|---|---|---|
| 1,120,580 | 12/1914 | Willis | 96—85 |
| 2,310,227 | 2/1943 | Gaspar | 96—73 |
| 2,420,631 | 5/1947 | Taylor | 96—99 |
| 2,423,460 | 7/1947 | McQueen | 96—100 |
| 2,448,060 | 8/1948 | Smith et al. | 96—108 |
| 2,612,448 | 9/1952 | Gaspar et al. | 96—53 |
| 2,694,636 | 11/1954 | Keller | 96—53 |
| 2,943,934 | 7/1960 | Gaspar et al. | 96—53 |
| 3,062,647 | 11/1962 | Herz | 96—66 |
| 3,243,294 | 3/1966 | Barr | 96—3 |

NORMAN G. TORCHIN, *Primary Examiner.*

A. T. SURO PICO, *Assistant Examiner.*

U.S. Cl. X.R.

96—3